United States Patent [19]
Waldbauer

[11] 3,920,405
[45] Nov. 18, 1975

[54] PROCESS FOR PRODUCING SOLID ALUMINUM SULPHATE
[75] Inventor: Johann Waldbauer, Krems, Donau, Austria
[73] Assignee: Krems-Chemie Gesellschaft m.b.H., Krems, Austria
[22] Filed: July 27, 1973
[21] Appl. No.: 383,436

[30] Foreign Application Priority Data
July 28, 1972  Austria.............................. 6526/72

[52] U.S. Cl............ 23/293 A; 23/300 R; 23/305 A; 423/556
[51] Int. Cl.² ......................................... C01F 7/74
[58] Field of Search .......... 423/556, 576; 23/293 A, 23/293 R, 273 F, 295 R, 301 SP, 305

[56] References Cited
UNITED STATES PATENTS
| | | | |
|---|---|---|---|
| 1,941,623 | 1/1934 | Rosenstein........................... | 423/576 |
| 2,413,714 | 1/1947 | Keeling............................... | 423/576 |
| 3,838,973 | 10/1974 | Ellithorpe et al..................... | 23/295 |

FOREIGN PATENTS OR APPLICATIONS
| | | | |
|---|---|---|---|
| 1,149,340 | 11/1959 | Germany............................ | 423/556 |
| 1,146,042 | 10/1960 | Germany............................ | 423/556 |
| 154,214 | 11/1953 | Australia............................. | 423/556 |
| 946,436 | 8/1956 | Germany............................ | 423/556 |
| 937,328 | 9/1963 | United Kingdom................. | 423/556 |

Primary Examiner—Oscar R. Vertiz
Assistant Examiner—Gary P. Straub

[57] ABSTRACT

A process for producing solid aluminum sulphate by cooling a melt thereof comprises pouring the melt on to a substrate and spraying finely divided water on to the layer of melt on the substrate. Preferred rates of spraying the water are disclosed depending upon whether the process is conducted continuously using an endless band as the substrate or discontinuously using a trough or tray as the substrate. The substrate may be covered with a hood to provide above the layer an atmosphere saturated with water vapor.

15 Claims, No Drawings

3,920,405

PROCESS FOR PRODUCING SOLID ALUMINUM SULPHATE

FIELD OF THE INVENTION

This invention relates to a process for the production of solid aluminum sulphate by cooling a melt of aluminum sulphate.

PRIOR ART

Solid aluminum sulphate can be produced from a melt thereof with a content of $Al_2O_3$ of 16 to 19% either continuously on endless belts of copper, rubber, stainless steel or similar resistant material, or discontinuously in troughs or on concrete trays. In the continuous process, the belts are cooled on their underside, for example by spraying with water, whilst in the discontinuous process the heat is dissipated through the bottoms of the troughs with or without cooling.

Attempts have already been made to accelerate the soldification process by the additional cooling of the surface, by cooling the melt to a temperature slightly above the crystallization point or by inoculating the melt shortly before feeding. In German Pat. No. 946 436, however, it is pointed out that such measures are only expedient up to a layer thickness of the aluminum sulphate melt of a maximum of 15 mm., because the poor heat dissipation from the center of the layer would cause too great a time lag in the case of thicker layers. Even when all the previously proposed measures for shortening the solidification operation are used, there is a certain cooling time below which it is no longer possible to go.

SUMMARY OF THE INVENTION

Surprisingly it has now been found that the cooling time required under the said conditions can be shortened appreciably if at a suitable point of time finely divided water is sprayed or sprinkled on the surface of the solidifying aluminum sulphate melt.

PREFERRED EMBODIMENTS

Accordingly, the present invention provides a process for the production of solid aluminum sulphate, wherein a melt of aluminum sulphate is poured on to a substrate to form a layer of the melt, and wherein finely divided water is sprayed on to the surface of the melt for at least part of its residence time on the substrate, whereafter the solidified layer is removed from the substrate.

When the present process is carried out continuously the substrate is preferably an endless belt, and it is preferred to spray the water in a quantity of 20 to 150 liters per hour, preferably 50 to 100 liters per hour, from a point which is at a distance of 1 to 15 meters, preferably 3 to 6 meters from the point of feed, as a result of which the cooling speed is almost twice as great as when no water is sprayed. When the present process is carried out discontinuously the substrate is preferably a tray or trough, and it is preferred, shortly after the pouring of the melt, to spray the surface of the melt for about 1 minute with 0.1 to 1 liter per sq. meter, preferably 0.25 to 0.75 liter per sq. meter, of water. Advantageously the spraying should be carried out within the first third of the total solidification time, especially from the second minute up to the first quarter of the solidification time.

Finally it has been found advantageous to arrange over the surface of the melt sprayed with water a closed mounting or hood with ventilation means. This mounting ensures the provision of an atmosphere which is saturated with water vapor and which prevents too rapid evaporation of the water which has been sprayed on. This mounting or hood can be of any desired form and may be fitted on after the spraying operation, although a permanent installation is to be preferred.

It is surprising that by means of the present process, the solidification time of the melt can be appreciably shortened, because one would have expected that, as a result of the application of water on to the surface of the solidifying melt, a dilution would occur which would restrict the crystallisability. Furthermore, it was to be feared that the evaporation of the water on the surface of the melt, would cause the surface to solidify rapidly and form an insulating layer which would hinder the dissipation of heat from the center of the melt to its surface.

The present process, when performed continuously, is preferably carried out by cooling an aluminum sulphate melt until it is just above the crystallization temperature, inoculating it with fine-grained aluminum sulphate and then pouring it in a metered quantity on to an endless belt. After about 3 meters, the melt runs through a zone approximately 3 meters long in which water is sprayed on to it. After the spraying zone, the aluminum sulphate is allowed to cool under the action of the cooled belt and the ambient air. At the end of the belt, the solidified aluminum sulphate can be lifted off easily and disintegrated. When the present process is performed discontinuously, it is preferred to cool an aluminum sulphate melt to just above the crystallization temperature and then to pour it into a trough or on to a tray, when it is possible to operate both with and without inoculation. After about 2 minutes, the turbid melt is sprayed with 0.5 liter of water per sq. meter of surface of the melt and is left to harden.

EXAMPLES

The following non-limiting Examples are intended to illustrate the process according to the invention.

EXAMPLE 1

On an endless steel belt which is arranged to provide a cooling zone having a width of 1000 mm. and a length of 36 m., and which moves at a speed of approximately 240 meters per hour, there are fed continuously 3500 kg. per hour of an aluminum sulphate melt which has been mixed in a rapid mixer with about 2% of ground aluminum sulphate, and which has a temperature of 103°C.. The belt is cooled underneath with water over its entire length.

About 3 meters from the feed point, approximately 70 liters of water per hour are sprayed from a number of nozzles on to the surface of the aluminum sulphate. After a total residence time on the belt of about 7 to 8 minutes the surface of the aluminum sulphate layer about 10 to 15 mm. thick is hard and non-tacky and the material is broken off at the end of the belt 9 minutes after the introduction of the feed.

EXAMPLE 2

(Comparative Example):

On to the steel belt described in Example 1, there is fed an aluminum sulphate melt in the manner described above, but the solidifying melt is not sprayed from above with water. It is found that the belt can only be operated at a speed of about 120 meters per hour because the material is only suitable for breaking after 16 to 18 minutes. Even after this time the surface is still not completely free from tackiness.

EXAMPLE 3

On to a steel plate cooled from below there is poured an inoculated aluminum sulphate melt in a layer thickness of 15 mm. Between the second and the third minute after pouring the melt, about 0.5 liter of water is sprayed on to the surface of the melt per sq. meter. After about 10 minutes the material is suitable for breaking and the surface is completely hard and free from tackiness.

EXAMPLE 4

(Comparative Example)

In the same way as in Example 3, an aluminum sulphate melt is poured in a layer thickness of 15 mm. on the steel plate, but the surface is not sprayed with water. The material is only suitable for breaking after about 20 minutes, and the surface is then still not completely free from tackiness.

We claim:

1. A process for the production of solid aluminum sulphate, comprising pouring a melt of aluminum sulphate on to a substrate to form a layer of said melt, spraying finely divided water on to the surface of said layer in a quantity sufficient to solidify the melt and achieve a dry crystallized surface in a substantially reduced period of cooling time without causing any dilution of the aluminum sulphate melt, and removing the solidified layer from the substrate.

2. The process of claim 1, wherein, before the melt is poured on to said substrate, the melt is cooled to a temperature which is slightly above its crystallization point.

3. The process of claim 1, wherein, before the melt is poured on to said substrate, the melt is inoculated with fine-grained aluminum sulphate.

4. The process of claim 1, wherein, before the melt is poured on to said substrate, the melt is cooled to a temperature which is slightly above its crystallization temperature and is inoculated with fine-grained aluminum sulphate.

5. The process of claim 1, wherein the water is sprayed within the first third of the soldification time.

6. The process of claim 1, wherein the water is sprayed from the second minute up to the first quarter of the solidification time.

7. The process of claim 1, wherein the substrate is covered with a hood provided with ventilator means to maintain above the layer an atmosphere saturated with water vapor.

8. The process of claim 1, wherein the water is sprayed shortly after the melt has been poured.

9. The process of claim 1, wherein the water is sprayed on the surface of said layer in a quantity of 0.1 to 1 liter per square meter.

10. The process of claim 1, wherein the water is sprayed on the surface of said layer in a quantity of 0.25 to 0.75 liter per square meter.

11. The process of claim 1, wherein the melt has a thickness of about 10 to 15 millimeters.

12. The process of claim 1, wherein said process is carried out discontinuously and the substrate is a trough or tray.

13. The process of claim 1, wherein the trough or tray is covered with a hood provided with ventilator means to maintain above the layer an atmosphere saturated with water vapor.

14. The process of claim 1, wherein the process is carried out continuously and the substrate is an endless belt.

15. The process of claim 14, wherein the endless belt is covered with a hood provided with ventilator means to maintain above the layer an atmosphere saturated with water vapor.

* * * * *